Figure 1:
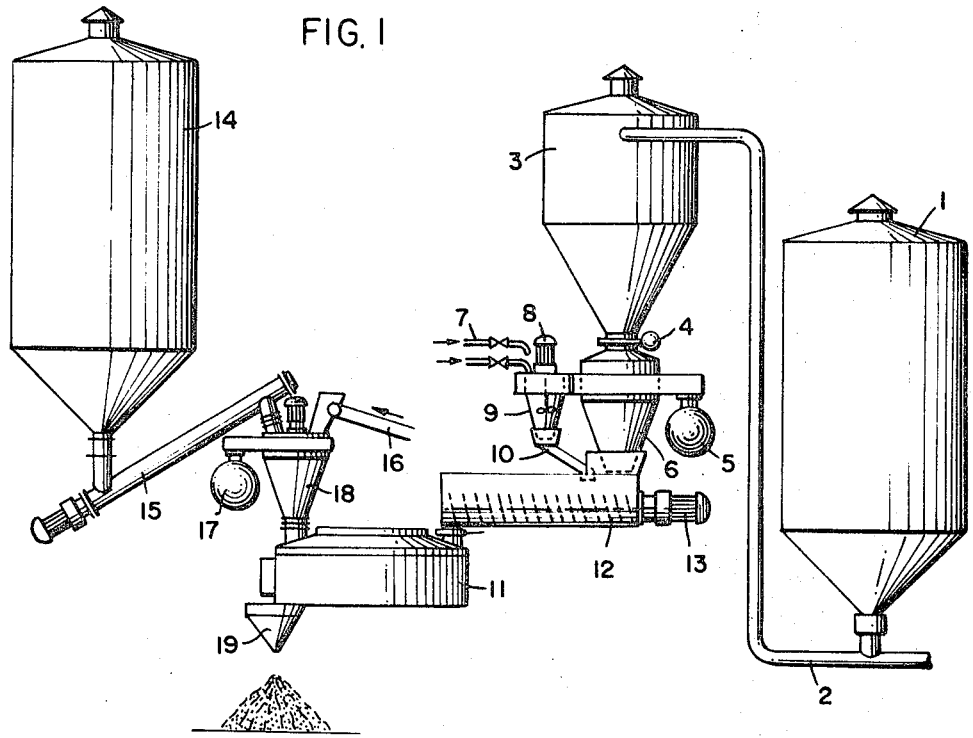

United States Patent

[11] 3,547,412

| [72] | Inventors | Karl-Heinz Klages<br>Neustadt, Weinstrasse;<br>Georg Friedrich Weisbrod, Ludwigshafen (Rhine), Germany |
|---|---|---|
| [21] | Appl. No. | 758,365 |
| [22] | Filed | Sept. 9, 1968 |
| [45] | Patented | Dec. 15, 1970 |
| [73] | Assignee | Badische Anilin- & Soda-Fabrik Aktiengesellschaft<br>Ludwigshafen (Rhine), Germany |
| [32] | Priority | Sept. 12, 1967 |
| [33] | | Germany |
| [31] | | 1,646,648 |

[54] PRODUCTION OF LIGHTWEIGHT CONCRETE
4 Claims, 2 Drawing Figs.

[52] U.S. Cl. .................................................. 259/148
[51] Int. Cl. .................................................. B28c 5/00

[50] Field of Search.......................................... 259/146,
147, 148, 149, 151, 153, 154, 164, 165, 166, 167, 168, 152

[56] References Cited
UNITED STATES PATENTS

| 304,615 | 9/1884 | Church | 259/148 |
| 1,823,343 | 9/1931 | Billner | 259/147 |
| 2,915,301 | 12/1959 | Selden | 259/147 |
| 3,456,924 | 7/1969 | Dietert | 259/148 |

Primary Examiner—Robert W. Jenkins
Attorney—Johnston, Root, O'Keeffe, Keil, Thompson & Shurtleff ABSTRACT: A process for the production of lightweight concrete in which expanded plastics particles, an adhesion promoter, a hydraulic binder and a mineral aggregate are used, and equipment for carrying out the process.

PATENTED DEC 15 1970

3,547,412

INVENTORS:
KARL-HEINZ KLAGES
GEORG FRIEDRICH WEISBROD

BY: Marzall, Johnston, Cook & Root
ATT'YS

PRODUCTION OF LIGHTWEIGHT CONCRETE

This invention relates to a method of producing lightweight concrete from hydraulic binders, mineral aggregates and particulate expanded plastics using an adhesion promoter.

It is known that particulate expanded plastics may be used as aggregates in the production of concrete. Owing to the low unit weight the strength of elements made from the material is unsatisfactory.

It is also known that the strength of lightweight concrete containing expanded plastics can be improved by using an adhesion promoter. Relatively large amounts of adhesion promoter are however required. Moreover it is found in practice that the quality of the building material is not easy to reproduce. It is found to be a disadvantage that the globules of, for example, polystyrene do not always intimately combine with the binder of the concrete. Poor strength results for example when the globules (without becoming completely surrounded by a firmly adherent layer of cement paste) accumulate so that the cement paste only fills up the cavities.

It is the object of this invention to provide a process for the production of lightweight concrete in which only small amounts of adhesion promoter are required, in which concrete having high strength is obtained even when the unit weight is low, and which gives concrete of consistent and reproducible quality.

The process according to this invention for the production of lightweight concrete from a hydraulic binder, a mineral aggregate, expanded plastics and an adhesion promoter comprises mixing the particulate expanded plastics with the adhesion promoter in a first stage and adding this mixture in a second stage to the mixture of hydraulic binder and mineral aggregate together with water.

It is advantageous in this process to avoid the presence of hydraulic binder and mineral aggregate in the first stage.

Particulate expanded organic plastics suitable for the process according to the invention generally have a mean particle size of from 1 to 20, particularly from 1.5 to 5 mm., and a bulk density of from 2 to 200kg./m.$^3$, particularly from 5 to 50kg./m.$^3$. The material is used in the form of irregularly-shaped particles, flakes or preferably in globular or bead form. The nature of the organic plastics is of minor importance. All conventional expanded organic plastics such as expanded polyethylene, polypropylene, polybutylene, polyurethanes or polycarbonates may be used as fillers. Inexpensive foams having mainly closed-cell structure such as those based on styrene polymers may be used with particular advantage. Foams which can be prepared from expandable particulate plastics containing expanding agent by simple heat treatment are preferred because expansion can then be carried out on the job site and thus the cost of transportation of the voluminous material can be avoided.

Lightweight concrete according to this invention generally contains 30 to 95 percent, particularly 60 to 85 percent, by volume, of plastics foam. Owing to the very low density of the expanded plastics, its proportion of the weight of the concrete is very small, generally less than 3 percent and particularly less than 2 percent. This is a great advantage from the economic point of view.

To achieve a satisfactory bond between the expanded plastics and the hydraulic binder, the former is mixed in the first stage with an adhesion promoter, for example an organic binder, an adhesive, a polymer dispersion, an epoxy resin or an organic silicon compound. It is preferred to use as the adhesion promoter a commercial epoxy resin which may be used for example in the form of an aqueous suspension or dispersion. Mixing the expanded plastics particles with the adhesion promoter has the effect of providing them with a coating having a special affinity for cement before they come into contact with the mixture of cement and sand, thus facilitating adhesion of the cement paste. Agglomeration of the plastics particles is effectively prevented in this way and a strong skeleton of concrete is formed between the particles. Other conventional aggregates, as for example glass fibers or asbestos, may be added if desired.

In addition to expanded plastics particles, conventional hydraulic binders such as lime, gypsum, anhydrite and preferably cement are used for the production of the lightweight concrete; conventional mineral aggregates such as sand, trass, powdered lime and quartz powder, and also other conventional additives, such as air-entraining agents, waterproofers, plasticizers and the like may also be added. The water-cement factor is generally from 0.2 to 0.8, preferably from 0.3 to 0.5, depending on the consistency of the mixture. The ratio of hydraulic binder to aggregate may be varied within wide limits. Generally up to 3kg. of aggregate is used per kg. of hydraulic binder. For a very low unit weight of the concrete (less than 700kg./m.$^3$), i.e. when the content of expanded plastics is high, the amount of aggregate should be small (about 0.01 to 1kg. per kilogram of cement).

It is expedient to see that in the first stage there is no hydraulic binder and aggregate present, i.e. that only the coating of the plastics with the adhesion promoter takes place. The hydraulic binder and the mineral aggregate are mixed with the plastics particles coated with adhesion promoter in the second stage. It has proved to be advantageous to mix the binder with the aggregate while adding water and then to add the mixture from the first stage.

A useful modification of the process according to this invention consists in coating the mixture from the first stage (prior to its introduction into the second stage) in a separate operation by treatment with dry, finely powdered mineral substances such as cement, trass powder, quartz powder or the like so that it is converted into a free-flowing form. The optimum amount of powdered mineral substance may easily be ascertained by preliminary experiment.

The invention also includes equipment for carrying out the process. This equipment consist of a first mixer which is in communication through metering means with a storage container for the expanded plastics and which additionally has metering means for the adhesion promoter. This first mixer is connected to a second mixer which communicates through metering means with storage containers for hydraulic binder and mineral aggregate.

Figure 2:
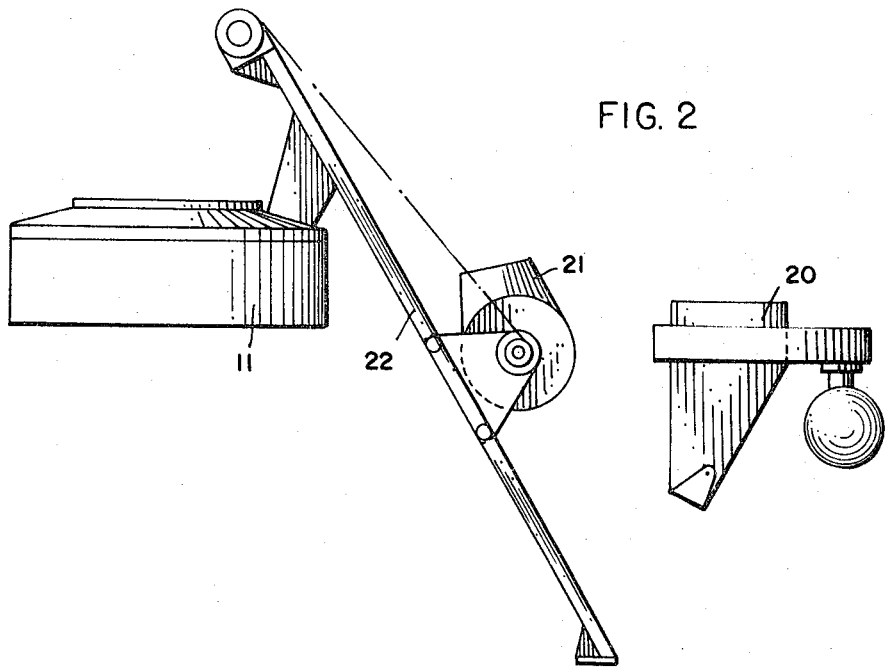

Equipment which is suitable for the process according to the invention is shown by way of example in the accompanying drawing in which:

FIG. 1 shows diagrammatically a mixing plant for carrying out the process according to the invention; and FIG. 2 shows a section of a modified version of such a plant.

The mixing plant shown in FIG. 1 comprises two large bins one for expanded plastics particles. These bins communicate through a pipeline 2 (to which compressed air can be supplied) with a storage bin 3 from which the expanded plastics particles are supplied through metering means 4 into a skip 6 connected with weighing means 5. It is convenient to arrange at the same height as the feed means for the expanded plastics, the feed means for the adhesion promoter. The adhesion promoter is sucked in liquid form through a pipeline 7 and supplied by a blower 8 through a hopper 9 and a short pipe 10 to premixing equipment.

In the example shown in FIG. 1, a horizontal mixing and conveying screw 12 is provided between the feed means for the expanded plastics particles and the adhesion promoter and the actual mixer, which is shown as a forced-circulation mixer 11. In the screw 12, which is driven by an electric motor 13, the expanded plastics particles are premixed with the adhesion promoter and discharged at the end of the screw 12 into a mixing trough 11.

The concrete making plant also includes, as usual, a cement silo 14 having an inclined screw conveyor 15, an elevator shown as a conveyor belt 16 for the other aggregate, for example sand, and a hopper 18, advantageously provided with a balance 17, which may also be emptied into the mixing trough 11. The finished mixture (prepared in a conventional manner) is discharged from the mixing trough at 19.

Another mixing vessel, for example a mixing skip coupled with an inclined elevator, may be provided instead of a horizontal mixing and conveying screw between the feed means for the expanded plastics particles and the adhesion promotor. Such a unit is diagrammatically shown in FIG. 2. The feed means 20 for the expanded plastics discharges at the bottom into a mixing skip 21 which is drawn up over an inclined track 22 and can be emptied at the top into the mixing trough 11. This arrangement has the advantage that at least some of the units of the mixing plant (namely the units for storage and mixing of the expanded plastics need not be located at such a high level as the mixing trough which is advantageously arranged at such a level that a truck can be loaded immediately below it.

All conventional equipment suitable for the production of concrete may be used as the mixing means. Twin shaft forced circulation mixers, countercurrent forced circulation mixers, pan forced circulation mixers and free-falling mixers are suitable. It is preferred to use cocurrent forced circulation mixers. The mixers may have one or more stirring means whose speed may vary within wide limits. The optimum speed for any given mixer may easily be determined by experiment. Mixing times of from 0.5 to 10 minutes are usually adequate.

The invention is illustrated by the following examples.

EXAMPLE 1

One hundred liters of expanded polystyrene (diameter of the particles 0.5 to 2.5mm.) having a bulk density of 15kg./m.$^3$ and 100g. of a commercial epoxide resin (prepared from the polyglycidol of diphenylacetone and p,p'-diamino-dicyclohexylmethane in the ratio 73:27) dispersed in about 5 liters of water are intimately mixed in a mixing vessel.

The mixture obtained is supplied to a second mixing vessel which has already been charged with 38.25kg. of cement, 4.25kg. of sand (0.6mm.) and 14 liters of residual water (total amount of water = 19 liters, water-cement factor: 0.4 to 0.5) and the whole is intimately mixed for 50 seconds. Slabs are prepared by a conventional method from this lightweight building material, the latter being compacted by about 18 percent by volume. The slabs of 30kg./cm.$^2$ and a flexural tensile strength of 15kg./cm.$^2$; the coefficient of thermal conductivity is about 0.07 to 0.09Kcal./m.h.°C.

EXAMPLE 2

One hundred liters of expanded polystyrene (particle size 0.5 to 5mm.) having a bulk density of 14kg./m.$^3$ and 100g. of a commercial polyepoxide resin (prepared from the polyglycidol of diphenylacetone and p,p'-diamino-dicyclohexylmethane in the ratio 73:27) dispersed in 5 to 6 liters of water are intimately mixed and then supplied to another mixing zone in which they are mixed with 10kg. of cement. Free-flowing particles are obtained which have a unit weight of about 150kg./m.$^3$.

After the cement covering has set, the particles are supplied to a cocurrent forced-circulation concrete mixer charged with 25kg. of cement, 5kg. of sand (0.6mm.) and 13 liters of water, and the whole is mixed intensely for 60 seconds. Building elements made from the lightweight concrete have a unit weight of 610kg./m.$^3$, a compressive strength of 29kg./cm.$^2$ and a flexural tensile strength of 14kg./cm.$^2$. The coefficient of thermal conductivity is about 0.08Kcal./m.h.°C.

We claim:

1. A process for the production of lightweight concrete from a hydraulic binder, mineral aggregate and particulate expanded plastics using an adhesion promoter which comprises mixing the particulate expanded plastics with the adhesion promoter in a first stage and supplying this mixture in a second stage to a mixture of the hydraulic binder and mineral aggregate while adding water.

2. A process as claimed in claim 1 wherein the first stage is carried out in the absence of hydraulic binder and mineral aggregate.

3. A process as claimed in claim 1 wherein the mixture obtained in the first stage is converted into a free-flowing form by treatment with finely powdered mineral substances prior to its introduction into the second stage.

4. A process as claimed in Claim 1 wherein an epoxy resin is employed as the adhesion promoter.